US011023775B2

(12) United States Patent
Ishikawa et al.

(10) Patent No.: US 11,023,775 B2
(45) Date of Patent: Jun. 1, 2021

(54) INFORMATION PROCESSING METHOD AND INFORMATION PROCESSING SYSTEM

(71) Applicant: Panasonic Intellectual Property Corporation of America, Torrance, CA (US)

(72) Inventors: Kazunobu Ishikawa, Osaka (JP); Takuya Yamaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/526,236

(22) Filed: Jul. 30, 2019

(65) Prior Publication Data

US 2020/0042826 A1 Feb. 6, 2020

(30) Foreign Application Priority Data

Aug. 2, 2018 (JP) .............................. JP2018-146203

(51) Int. Cl.
*G06T 7/73* (2017.01)
*G06K 9/62* (2006.01)
*G06K 9/00* (2006.01)

(52) U.S. Cl.
CPC ....... *G06K 9/6256* (2013.01); *G06K 9/00805* (2013.01); *G06K 9/6212* (2013.01); *G06T 7/73* (2017.01)

(58) Field of Classification Search
CPC ............ G06K 9/6256; G06K 9/00805; G06K 9/6212; G06K 9/00791; G06K 9/00771; G06T 7/73; G06N 20/00
See application file for complete search history.

(56) References Cited

U.S. PATENT DOCUMENTS

2015/0302251 A1* 10/2015 Smith .................. G06K 9/4671
382/117
2017/0080853 A1* 3/2017 Raghu ................ G06K 9/00791
(Continued)

FOREIGN PATENT DOCUMENTS

| JP | 2015-184810 | 10/2015 |
| JP | 2017-102838 | 6/2017 |
| JP | 2017-139725 | 8/2017 |

OTHER PUBLICATIONS

Extended European Search Report dated Nov. 15, 2019 in corresponding European Patent Application No. 19189120.9.
(Continued)

*Primary Examiner* — Sumati Lefkowitz
*Assistant Examiner* — Dalen O Goodson
(74) *Attorney, Agent, or Firm* — Wenderoth, Lind & Ponack, L.L.P.

(57) ABSTRACT

An information processing method includes the following performed using a computer: acquiring images created through capturing at the same time, and positions and capturing directions of image capturing devices that created respectively each of the images; acquiring object detection results obtained respectively through object detection processes performed using each of the images; and performing a training data selection process using the images, the positions and the capturing directions, and the object detection results acquired. The training data selection process includes: calculating a common region that is seen in the images in common, based on the positions and the capturing directions; determining a degree of agreement among the object detection results in the common region; and selecting an image to be used as training data from among the images, according to the degree of agreement.

11 Claims, 12 Drawing Sheets

(56) References Cited

U.S. PATENT DOCUMENTS

2017/0161572 A1* 6/2017 Zhao ................. G06K 9/00791
2018/0343442 A1 11/2018 Yoshikawa et al.

OTHER PUBLICATIONS

C. Leistner et al., "Visual on-line learning in distributed camera networks", Distributed Smart Cameras, ICDSC 2008, pp. 1-10, XP031329233, Sep. 7, 2008.

* cited by examiner

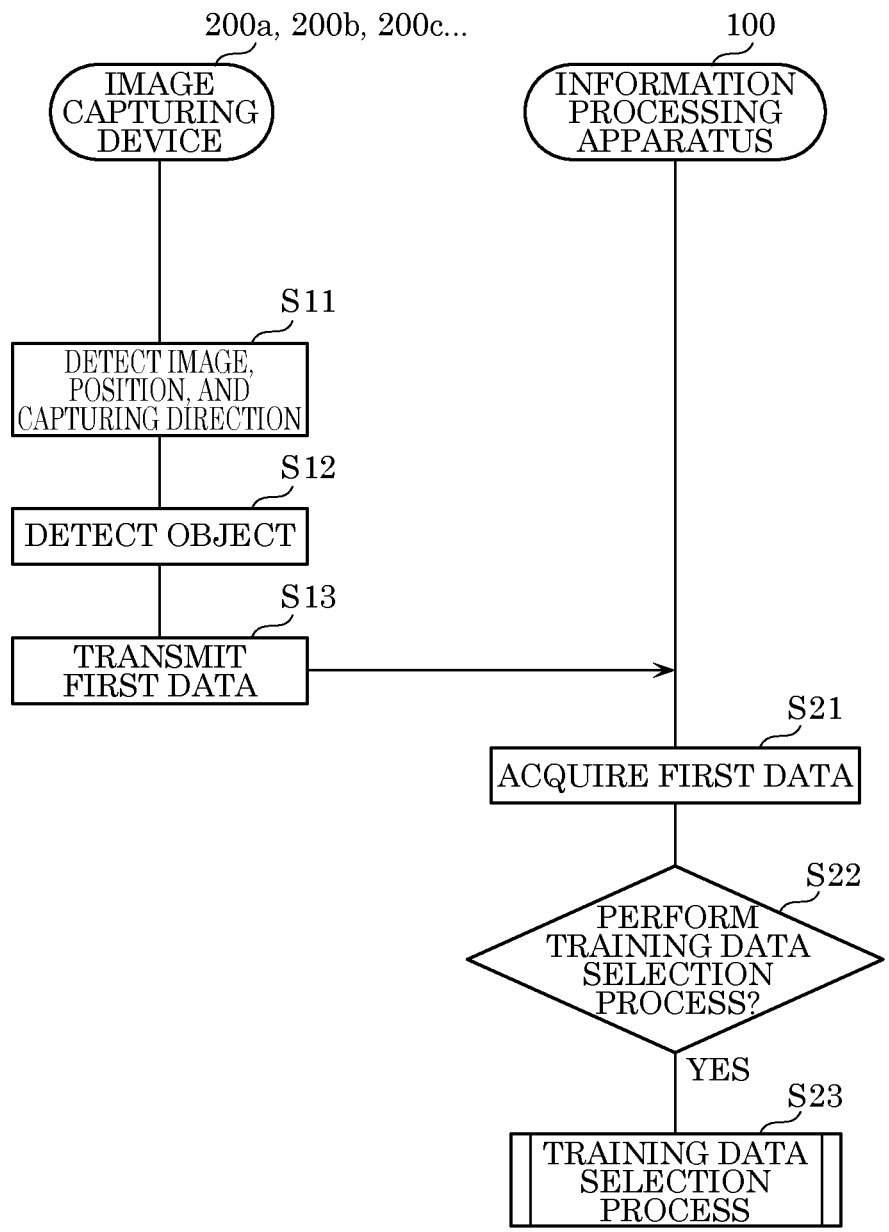

INFORMATION PROCESSING METHOD AND INFORMATION PROCESSING SYSTEM

CROSS REFERENCE TO RELATED APPLICATION

This application claims the benefit of priority of Japanese Patent Application Number 2018-146203 filed on Aug. 2, 2018, the entire content of which is hereby incorporated by reference.

BACKGROUND

1. Technical Field

The present disclosure relates to an information processing method and an information processing system for selecting images to be used as training data.

2. Description of the Related Art

Japanese Unexamined Patent Application Publication No. 2017-102838 (hereafter referred to as Patent Literature 1 (PTL 1)) discloses a database construction system that automatically collects supervised training data for machine learning that uses a result of detection by one of a plurality of kinds of sensors as training data to perform recognition of objects from outputs of another sensor.

SUMMARY

By the technique of PTL 1, however, in a case where a precision or an accuracy (hereinafter, also referred to simply as a precision) of a result of detection by a sensor to be used as training data is low, the result of detection by the sensor is not adopted as training data. Therefore whether the training data is obtained or not depends on the precision of the first sensor. As a result, it is difficult for the technique of PTL 1 to obtain training data stably.

Hence, the present disclosure has an objective to provide an information processing method and an information processing system that are less susceptible to low precision of an object detection process using sensors and are capable of providing captured images to be used as training data in a stable manner.

An information processing method according to the present disclosure includes the following performed using a computer: acquiring a plurality of images created through capturing at the same time, and positions and capturing directions of a plurality of image capturing devices that created respectively each of the images; acquiring a plurality of object detection results, wherein the object detection results are obtained respectively through a plurality of object detection processes performed using each of the images; and performing a training data selection process using the images, the positions and the capturing directions, and the object detection results acquired, wherein the training data selection process includes: calculating a common region that is seen in the images in common, based on the positions and the capturing directions; determining a degree of agreement among the object detection results in the common region; and selecting an image to be used as training data from among the images, according to the degree of agreement.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The information processing method and the information processing system according to the present disclosure are less susceptible to low precision of an object detection process using sensors and are capable of providing captured images to be used as training data in a stable manner.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a sequence diagram illustrating an example of operations performed in an information processing system according to an embodiment;

Figure 1:
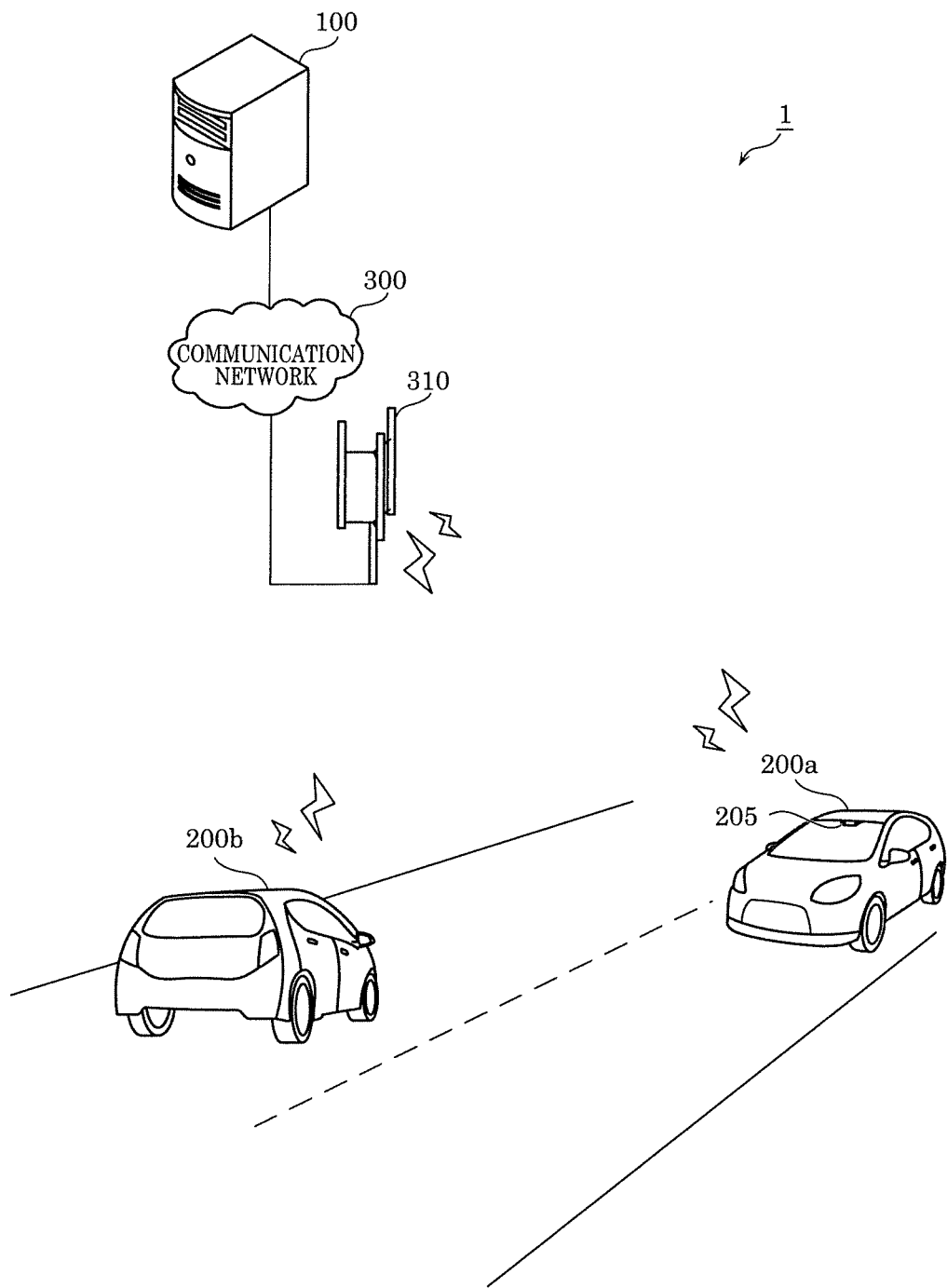
FIG. 1 is a diagram illustrating an appearance of an information processing system according to Embodiment 1.

DETAILED DESCRIPTION OF THE EMBODIMENTS (Underlying Knowledge Forming the Basis of the Present Disclosure)

In recent years, object detection using machine learning such as deep learning on images taken by cameras has been put to practical use in fields such as automated driving, video surveillance, and robotics. Such object detection requires a large amount of training data used in machine learning. Hence, a large number of images taken by different cameras are collected, and a person gives correct solutions to the collected images to create the training data.

However, giving the correct solutions to the images by a person increases costs, and it is thus not preferable to create the training data simply from all of a large number of obtained images. In addition, even if the training data can be obtained by giving the correct solutions to all of the large number of images without regard to costs, the large amount of obtained training data needs to be subjected to machine learning, which increases a processing load on the machine learning and increases a processing time. To perform machine learning efficiently, it is therefore necessary to select images useful for the machine learning from among a large number of images.

Here, the large number of images used for the machine learning is required to include a plurality of images taken in varied situations different from one another, that is, a plurality of various images. In other words, using a plurality of images taken in situations different from one another is more effective in implementing efficient machine learning than using a plurality of images taken in situations similar to one another.

As described above, the database construction system of PTL 1 collects the supervised training data by associating highly confident recognition data on objects based on output data from a first sensor with training data and input data being output data obtained by a second sensor.

However, in a case where the confidence of the recognition data on objects based on the output data from the first sensor is not high, there is a risk of generating incorrect training data. For example, since the confidence of the recognition data on objects depends on a quality of the first sensor, the first sensor is to be required to have a certain or higher quality. That is, the conventional technique requires a result of detection by a sensor with a high precision, which increases costs. In addition, according to PTL 1, in a case where a quality of a result of detection by the first sensor is poor, the result of detection by the first sensor is not adopted as training data. Therefore, whether the training data is obtained or not depends on the quality of the first sensor. This makes it difficult to provide the training data in a stable manner.

In order to solve such a problem, an information processing method according to the present disclosure includes the following performed using a computer: acquiring a plurality of images created through capturing at the same time, and positions and capturing directions of a plurality of image capturing devices that created respectively each of the images; acquiring a plurality of object detection results, wherein the object detection results are obtained respectively through a plurality of object detection processes performed using each of the images; and performing a training data selection process using the images, the positions and the capturing directions, and the object detection results acquired, wherein the training data selection process includes: calculating a common region that is seen in the images in common, based on the positions and the capturing directions; determining a degree of agreement among the object detection results in the common region; and selecting an image to be used as training data from among the images, according to the degree of agreement. The same time might be the time point considered to be the same.

For this reason, in a case where the plurality of image capturing devices capture an object common to the plurality of image capturing devices, the plurality of object detection results from the plurality of object detection processes for the common object can be obtained. This enables selection of images to be used as training data according to the degree of agreement among the plurality of object detection results about the common object. For example, images subjected to the object detection processes that produce object detection results not agreeing with one another can be selected as the images to be used as the training data. Therefore, the information processing method is less susceptible to a precision of an object detection process using sensors and is capable of providing captured images to be used as training data in a stable manner.

Furthermore, the information processing method may further include: determining whether to perform the training data selection process, according to a specific object detection result obtained through an object detection process performed using an image created through capturing by a specific image capturing device of the image capturing devices; and performing the training data selection process in a case where the training data selection process is determined to be performed.

For this reason, the training data selection process can be performed in a situation that needs the learning, such as a situation where the precisions of the object detection results are low, which makes it possible to obtain intended training data more reliably. In addition, by not performing the training data selection process in a situation that does not need the learning, unnecessary performance of the process can be reduced.

Furthermore, an other image capturing device which is one of the image capturing devices other than the specific image capturing device may be an image capturing device capable of capturing ranges overlapping a capturing range of the specific image capturing device.

For this reason, the other image capturing devices can be selected with reference to the specific image capturing device. Therefore, the object detection results useful for determining the degree of agreement can be obtained.

Furthermore, the other image capturing device may be an image capturing device that is located within a predetermined range from a reference location with reference to a position of the specific image capturing device.

For this reason, other image capturing devices highly likely to capture the same object that the specific image capturing device captures can be selected.

Furthermore, the information processing method may further include causing an other image capturing device which is one of the image capturing devices other than the specific image capturing device to perform the capturing.

For this reason, the other image capturing devices can use the same capturing conditions that the specific image capturing device uses. For example, capturing time points can be adjusted to time points that are considered to be the same.

Furthermore, the specific object detection result may include a likelihood of an object detection result, and the determining whether to perform the training data selection process may include: determining that the training data selection process is to be performed when the likelihood satisfies a predetermined condition.

For this reason, the training data selection process can be performed in a situation that needs the learning, such as a situation where the likelihood is low, which makes it possible to obtain intended training data more reliably. In addition, by not performing the training data selection process in a situation that does not need the learning, unnecessary performance of the process can be reduced.

Furthermore, the determining whether to perform the training data selection process may include: acquiring statistical information on at least one item of information from among capturing times of the images, positions of the image capturing devices that perform the capturing to create the images, and an attribute or a state of an object detected through the object detection processes; and determining whether to perform the training data selection process using the acquired statistical information.

For this reason, the training data selection process can be performed in a situation that needs the learning, such as a situation where capturing conditions or capturing details are suitable for the learning from a statistical viewpoint, which makes it possible to obtain intended training data more reliably. In addition, by not performing the training data selection process in a situation that does not need the learning, unnecessary performance of the process can be reduced.

Furthermore, the statistical information may include rarity information that indicates a rarity of the at least one item of information, and the determining whether to perform the training data selection process may include: determining that the training data selection process is to be performed when the rarity satisfies a predetermined condition.

For this reason, the training data selection process can be performed in a case where the rarity satisfies the predetermined condition, which makes it possible to obtain intended training data more reliably. In addition, by not performing the training data selection process in a case where the rarity fails to satisfy the predetermined condition, unnecessary performance of the process can be reduced.

Furthermore, in the training data selection process, in a case where there is an object detection result that does not agree with others of the object detection results, an image to be used as training data may be selected from among the images.

This enables selection of images as training data. For example, images subjected to the object detection processes that produce object detection results having a possibility of false detection or omission of detection can be selected as the training data. As a result, the image taken in a situation different from a situation of an image that is already selected as the training data can be selected as the training data.

Furthermore, in a case where performances of the image capturing devices are same and performances of the object detection processes are same, the image to be used as the training data may be selected from among the images according to a number or a ratio of agreeing object detection results of the object detection results.

For this reason, for example, images with which the number of agreeing object detection results is less than a predetermined number or a ratio of agreement among the object detection results is lower than a predetermined ratio can be selected as the training data.

Furthermore, in one of a case where performances of the image capturing devices are different from one another and a case where performances of the object detection processes are different from one another, a parameter for the training data selection process may be determined according to how high the performances of the image capturing devices are or how high the performances of the object detection processes are, and the training data selection process with the determined parameter may be performed.

For this reason, even in a case where the plurality of image capturing devices have specifications different from one another or the plurality of object detection processes have specifications different from one another, the respective specifications are taken into account, and thus images including an image subjected to the object detection process that produces an object detection result having a possibility of false detection or omission of detection can be selected as the training data. As a result, the image taken in a situation different from a situation of an image that is already selected as the training data can be selected as the training data.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, an information processing method and an information processing system will be described in detail with reference to the drawings.

Note that each of the following embodiments shows an specific example of the present disclosure. The numerical values, shapes, materials, structural components, the arrangement and connection of the structural components, steps, the processing order of the steps, etc. shown in the following embodiments are mere examples, and thus are not intended to limit the present disclosure. Furthermore, among the structural components described in the following embodiments, structural components not recited in any one of the independent claims that indicate the broadest concepts are described as optional structural components.

EMBODIMENT

An embodiment will be described below with reference to FIG. 1 to FIG. 10.

[1-1. Configuration]

FIG. 1 is a diagram illustrating an appearance of an information processing system according to the embodiment.

Specifically, FIG. 1 illustrates information processing apparatus 100, image capturing devices 200*a* and 200*b*, communication network 300, and base station 310 of a mobile telecommunications system. Of these constituent components, for example, information processing system 1 includes information processing apparatus 100 and image capturing devices 200*a* and 200*b*. Note that, as image capturing devices 200*a* and 200*b*, FIG. 1 illustrates vehicles each include camera 205, but image capturing devices 200*a* and 200*b* are not limited to the vehicles and may be other kinds of image capturing devices such as surveillance cameras. In addition, although there are two image capturing devices 200*a* and 200*b*, the number of image capturing devices may be three or more.

Information processing apparatus 100 is an apparatus that acquires a plurality of images taken by image capturing devices 200*a* and 200*b* and selects training data for machine learning from among the plurality of acquired images. Information processing apparatus 100 is, for example, a server.

Image capturing devices 200*a* and 200*b* are vehicles each of which includes camera 205 and performs automated driving or driver assistance using, for example, a result of object detection or object recognition obtained by use of image data obtained by camera 205. Note that image capturing devices 200*a* and 200*b* do not necessarily need to have a function of performing the automated driving or driver assistance as long as they include camera 205.

Communication network 300 may be a general-purpose network such as the Internet or may be a dedicated network. Base station 310 is, for example, a base station used in a mobile telecommunications system such as the third generation (3G) mobile telecommunications system, the fourth generation (4G) mobile telecommunications system, or LTE®.

Next, a specific example of a hardware configuration of information processing apparatus 100 will be described with reference to FIG. 2.

Figure 2:
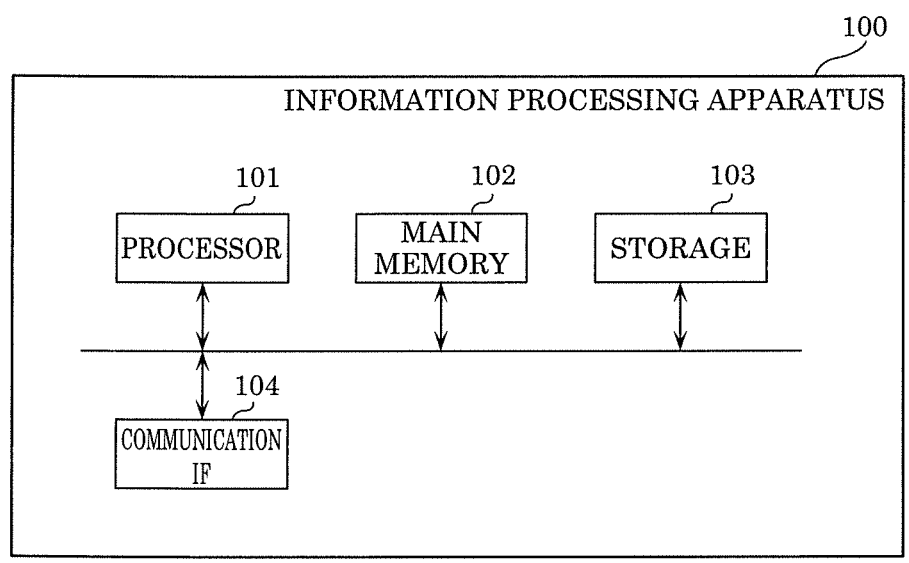
FIG. 2 is a block diagram illustrating an example of a hardware configuration of an image processing apparatus according to Embodiment 1.

FIG. 2 is a block diagram illustrating an example of a hardware configuration of the image processing apparatus according to the Embodiment.

As illustrated in FIG. 2, information processing apparatus 100 has a hardware configuration including processor 101, main memory 102, storage 103, and communication interface (IF) 104.

Processor 101 is a processor that executes a control program stored in storage 103 or the like.

Main memory 102 is a volatile storage area used by processor 101 executing the control program as a work area.

Storage 103 is a nonvolatile storage area for holding the control program or various kinds of data such as image data and point cloud data.

Communication IF 104 is a communication interface for communication with image capturing devices 200a, 200b, etc., over a communication network. Communication IF 104 is, for example, a wired LAN interface. Note that communication IF 104 may be a wireless LAN interface. Communication IF 104 is not limited to a LAN interface and may be any kind of communication interface that can establish a communication connection to the communication network.

Next, a specific example of a hardware configuration of image capturing devices 200a, 200b, etc., will be described with reference to FIG. 3.

Figure 3:
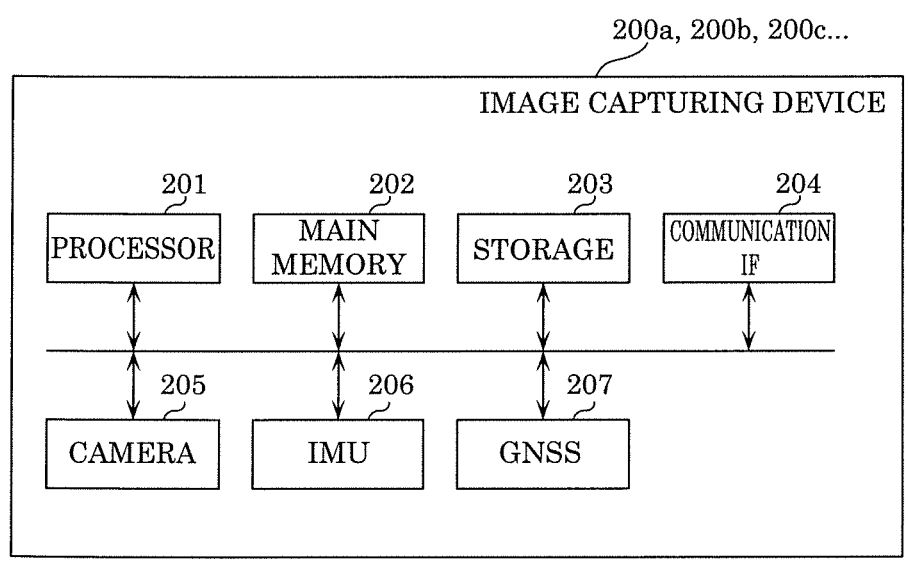
FIG. 3 is a block diagram illustrating an example of a hardware configuration of a vehicle according to Embodiment 1.

FIG. 3 is a block diagram illustrating an example of a hardware configuration of a vehicle according to Embodiment 1.

As illustrated in FIG. 3, each of image capturing devices 200a, 200b, 200c and the like has a hardware configuration including processor 201, main memory 202, storage 203, communication interface (IF) 204, camera 205, inertial measurement unit (IMU) 206, global navigation satellite system (GNSS) 207. Since image capturing devices 200a, 200b, and the like have the same configuration, image capturing device 200a will be described below, and description of the configuration of the others, image capturing devices 200b and 200c, will be omitted.

Processor 201 is a processor that executes a control program stored in storage 203 or the like. Processor 201 may include a processor used in an Electronic Control Unit (ECU) for performing automated driving or driver assistance in image capturing device 200a.

Main memory 202 is a volatile storage area used by processor 201 executing the control program as a work area.

Storage 203 is a nonvolatile storage area for holding the control program or various kinds of data such as image data and point cloud data.

Communication IF 204 is a communication interface for communication with information processing apparatus 100 over communication network 300. That is, communication IF 204 may be any communication interface that can establish a communication connection to communication network 300. Specifically, communication IF 204 is a communication interface for establishing a communication connection to communication network 300 through a communication connection to base station 310 of the mobile telecommunications system. Communication IF 204 may be, for example, a wireless communication interface conforming to a telecommunications standard used in a mobile telecommunications system such as the third generation (3G) mobile telecommunications system, the fourth generation (4G) mobile telecommunications system, or LTE®. Furthermore, communication IF 204 may be, for example, a wireless local area network (LAN) interface conforming to IEEE 802.11a, b, g, n, or ac standard or may be an communication interface that establishes a communication connection to communication network 300 through a communication connection to a router (e.g., a mobile wireless LAN router) not illustrated.

Camera 205 is an optical sensor held in image capturing device 200a, including an optical system such as lenses, and including an image sensor, and is an example of the first sensor.

IMU 206 is a sensor device including an acceleration sensor and a gyro sensor. The acceleration sensor is a sensor that detects accelerations that image capturing device 200a undergoes in three different directions, respectively. The gyro sensor is a sensor that detects angular velocities of respective rotations of image capturing device 200a about three axes in three different directions.

GNSS 207 receives information indicating a position of GNSS 207 itself from artificial satellites including global positioning system (GPS) satellites. That is, GNSS 207 detects a current position of image capturing device 200a.

Next, a functional configuration of information processing system 1 will be described with reference to FIG. 4.

Figure 4:
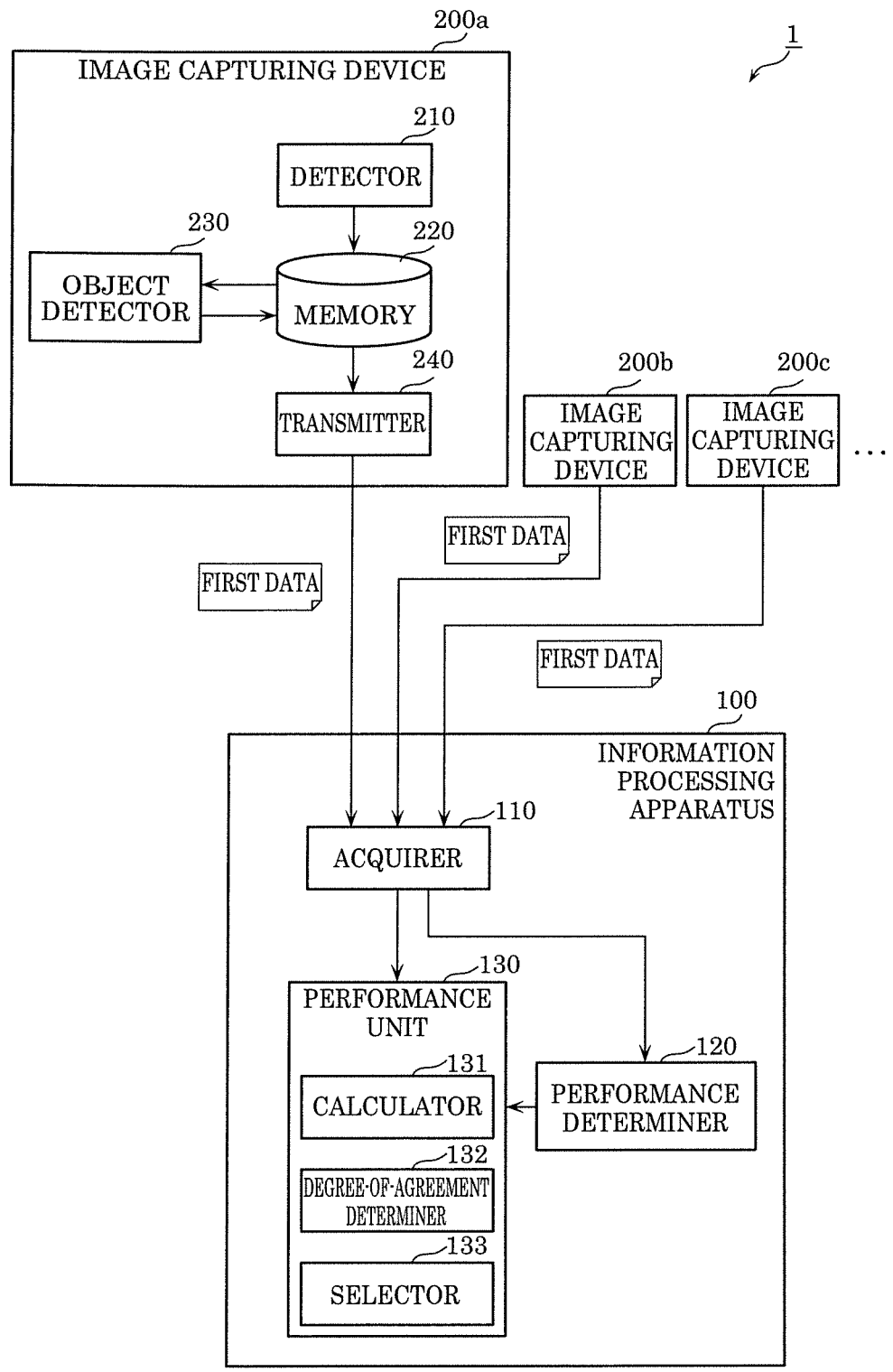
FIG. 4 is a block diagram illustrating an example of a functional configuration of the information processing system according to Embodiment 1.

FIG. 4 is a block diagram illustrating an example of a functional configuration of the information processing system according to an embodiment. Note that FIG. 4 does not illustrate communication network 300 and base station 310 illustrated in FIG. 1.

A functional configuration of image capturing device 200a will be described first.

Image capturing device 200a has a functional configuration including detector 210, memory 220, object detector 230, and transmitter 240. The other image capturing devices, image capturing devices 200b, 200c, and the like, have the same functional configuration as image capturing device 200a.

Detector 210 detects images taken by camera 205 of image capturing device 200a. Detector 210 also detects a position and a capturing direction of image capturing device 200a at a time when the image is created by the capturing by camera 205. As the position and capturing direction of image capturing device 200a at the time when the image is created by the capturing, a position and a capturing direction that are detected at a time point closest to the time point at which the image is captured may be adopted, or a latest position and a latest capturing direction of a plurality of positions and a plurality of capturing directions detected at the time point at which the image is captured may be adopted. For example, the position of image capturing device 200a is detected by GNSS 207. For example, the capturing direction of image capturing device 200a may be detected by use of a detected value from IMU 206, may be detected by use of a detected value from GNSS 207, or may be detected by use of a combination of detected values from IMU 206 and GNSS 207. In a case where image capturing device 200a includes a geomagnetic sensor, the capturing direction may be detected by use of a detected value from the geomagnetic sensor.

The capturing direction is a capturing direction of camera 205 and a direction predetermined for image capturing device 200a. In a case where camera 205 is disposed in a vehicle as image capturing device 200a with the capturing direction fixed, a direction in which camera 205 faces with respect to the vehicle is the capturing direction. For example, in a case where camera 205 captures an image ahead of the vehicle, a direction ahead of the vehicle is the capturing direction.

Detector 210 stores the plurality of images in memory 220 after associating a plurality of frames or a plurality of still images forming the plurality of images with capturing time points, which are the time at which the frames or the still images are taken. In addition, detector 210 associates the plurality of positions with detection time points, each of which is the time at which the relevant position is detected, and stores the positions and the detection time points in memory 220. Similarly, detector 210 associates the plurality of capturing directions with detection time points, each of which is the time at which the relevant capturing direction is detected, and stores the capturing directions and the detection time points in memory 220. To associate the plurality of images with the plurality of positions and the plurality of capturing directions according to detection time points, positions and capturing directions obtained at time points closest to time points at which the images are obtained may be associated, or the plurality of images, and the plurality of positions and the plurality of capturing directions detected during predetermined time intervals may be associated with each other.

Detector 210 is provided by, for example, a combination of camera 205, IMU 206, GNSS 207, and the like.

Memory 220 stores the plurality of images detected by detector 210 together with the respective capturing time points of the plurality of images. In addition, memory 220 stores the plurality of positions and the plurality of capturing directions detected by detector 210 together with the respective detection time points of the plurality of positions and the plurality of capturing directions. In addition, memory 220 associates object detection results detected through the object detection process by object detector 230 on the images with the images and stores the images and the object detection results. Memory 220 is provided by, for example, storage 203.

Object detector 230 performs the object detection process using a predetermined object detection model on each of the plurality of images detected by detector 210 to detect an object included in the images. For example, object detector 230 may perform the object detection process on the plurality of images stored in memory 220 or may perform the object detection process on the plurality of images detected by detector 210. By performing the object detection process on, for example, an image, object detector 230 recognizes an attribute or a state of an object included in the image. Examples of the attribute of an object include a person, a vehicle, and the like, and may further include a sex, an age, and the like of the person, and a body type and the like of the vehicle. The state of an object indicates standing, sitting, lying, walking, running, or the like when the object is a person, or indicates traveling, slowing down, stopping, or the like when the object is a vehicle. To recognize the attribute of an object, for example, object detector 230 evaluates, for each attribute of kinds of objects, a likelihood that the detected object has the attribute, and based on the evaluated likelihood, recognizes an attribute of the detected object. For example, when the evaluated likelihood is the highest and higher than other likelihoods by a predetermined difference value or larger, object detector 230 may recognizes the attribute as the attribute of the object. The likelihood is an accuracy, a credibility, a score, or the like of the object detection, and a likelihood showing a higher value indicates a higher evaluation of the object detection result. As seen from the above, the object detection result may include a likelihood.

Object detector 230 associates an image with the object detection result obtained by performing the object detection process on the image and stores the image and object detection result in memory 220. Associating the image with the object detection result may be performed by giving the object detection result an identifier to identify the image or may be performed by giving the object detection result an identifier shared with the image.

Object detector 230 is provided by, for example, a combination of processor 201, main memory 202, and storage 203.

Figure 5:
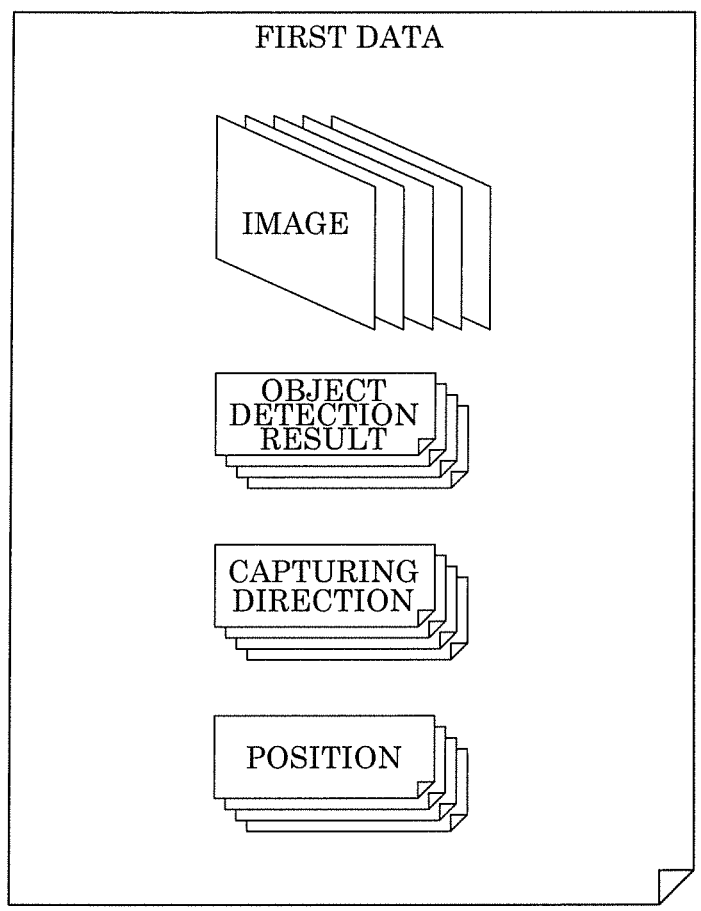
FIG. 5 is a diagram illustrating an example of a configuration of first data.

Transmitter 240 transmits, to information processing apparatus 100, first data that includes the plurality of images, the plurality of positions, the plurality of capturing directions, and the plurality of object detection results stored in memory 220, as illustrated in FIG. 5. Transmitter 240 may transmit the first data obtained through the detection by detector 210 to information processing apparatus 100 periodically, for example, every day or every week. Alternatively, for example, when a vehicle being image capturing device 200a is parked in a storage space for the vehicle such as a home of a driver of the vehicle, transmitter 240 may transmit the first data obtained during traveling of the vehicle until the parking to information processing apparatus 100 via, for example, a wireless LAN router provided in the home. At this time, in a case where there is first data detected before but not transmitted to information processing apparatus 100 yet, transmitter 240 may transmit the first data to information processing apparatus 100. Note that FIG. 5 is a diagram illustrating an example of a configuration of the first data.

Transmitter 240 is provided by, for example, processor 201, main memory 202, storage 203, communication IF 204, and the like.

Next, a functional configuration of information processing apparatus 100 will be described.

Information processing apparatus 100 has a functional configuration including acquirer 110, performance determiner 120, and performance unit 130.

Acquirer 110 acquires first data from each of the plurality of image capturing devices 200a, 200b, 200c, and the like. Acquirer 110 thereby acquires a plurality of images created through capturing, positions and capturing directions of the plurality of image capturing devices 200a, 200b, 200c, and the like that perform the capturing to create the plurality of images, and a plurality of object detection results obtained by a plurality of object detection processes by the plurality of image capturing devices 200a, 200b, 200c, and the like.

Performance determiner 120 determines whether to perform a training data selection process using performance unit 130, according to a specific object detection result that is performed by use of images created through capturing by a specific image capturing device of the plurality of image capturing devices 200a, 200b, 200c, and the like. Performance determiner 120 may determine that the training data selection process is to be performed in a case where, for example, a likelihood included in an object detection result from the specific image capturing device satisfies a predetermined condition. That is, the specific image capturing device is an image capturing device that outputs an object detection result satisfying the predetermined condition out of a plurality of object detection results.

The object detection result satisfying the predetermined condition is, for example, one including evaluated likelihoods of a plurality of attributes of which a difference value between a highest likelihood and a likelihood is less than a predetermined difference value. That is, the case where the predetermined condition is satisfied is a case where the object detection result is such that it is difficult to narrow a plurality of attributes or a plurality of states of an object down to one of the plurality of attributes or the plurality of states, and hence a precision of the detection result is not trustworthy. Specifically, the case is where there is substantially no difference between a likelihood of a first attribute and a likelihood of a second attribute, and it is impossible to determine which of the first attribute and the second attribute is to be an attribute of an object as the object detection result. Note that this is true for a state of an object.

Alternatively, the object detection result satisfying the predetermined condition is, for example, one including likelihoods of which a highest likelihood is higher than other likelihoods by a predetermined difference value or larger or likelihoods of which a likelihood exceeds a predetermined likelihood. That is, the case where the predetermined condition is satisfied is a case where the object detection result is such that it is easy to narrow a plurality of attributes or a plurality of states of an object down to one of the plurality of attributes or the plurality of states, and hence a precision of the detection result is trustworthy.

Performance determiner 120 may acquire statistical information on image attribute information that indicates an image attribute of at least one of a capturing time of the plurality of images, positions of the image capturing devices where the image capturing devices create images through capturing, and an attribute or a state of an object detected through object detection processes in the plurality of image capturing devices 200a, 200b, 200c, and the like, and may use the acquired statistical information to determine whether to perform the training data selection process. Note that the statistical information may include rarity information that indicates a rarity of the image attribute information. In a case where the rarity indicated by the rarity information satisfies a predetermined condition, performance determiner 120 may determine that the training data selection process is to be performed. The rarity indicated by the rarity information satisfying the predetermined condition means that the first data includes an image attribute having a rarity. Here, the image attribute having a rarity means that a degree of deviation (or an outlier) of an image attribute of an image in question with respect to a plurality of image attributes of a plurality of images already selected as the training data is higher than a predetermined threshold value, in one or a combination of two or more of the capturing time, the positions of the image capturing devices, and the attribute or the state of the object Performance unit 130 performs the training data selection process using a plurality of first data items acquired by acquirer 110. Performance unit 130 may perform the training data selection process in a case where performance determiner 120 determines that the training data selection process is to be performed.

Performance unit 130 includes, specifically, calculator 131, degree-of-agreement determiner 132, and selection unit 133.

In the training data selection process, calculator 131 calculates the common region that is seen in the plurality of images in common in the plurality of first data items, based on respective positions and capturing directions of the plurality of image capturing devices 200a, 200b, 200c, and the like at predetermined time points. For example, calculator 131 extracts a plurality of first data items including the plurality of images taken at the predetermined time points, from the plurality of first data items acquired by acquirer 110. The predetermined time points refer to time points that can be considered to be the same. That is, the predetermined time points are not necessarily the same time and may include all time points included in a predetermined duration set with respect to a time point. The predetermined duration may be, for example, a time based on a capturing interval for taking images in the plurality of image capturing devices 200a, 200b, 200c, and the like, for example, a time one to ten times as long as the capturing interval.

In the present embodiment, the plurality of image capturing devices 200a, 200b, 200c, and the like move since the plurality of image capturing devices 200a, 200b, 200c, and the like are vehicles. It is therefore more often the case where the plurality of images taken by the plurality of image capturing devices 200a, 200b, 200c, and the like do not include the common region. As a result, if calculator 131 performs the process of calculating the common region on all of the plurality of first data items acquire by acquirer 110, an efficiency of the process is poor. Therefore, calculator 131 may perform a process of extracting a plurality of first data items including a plurality of images sharing the common region, before the process of calculating the common region.

For example, calculator 131 extracts the plurality of first data items taken by the plurality of image capturing devices 200a, 200b, 200c, and the like capable of capturing ranges overlapping one another, by analyzing the positions and the capturing directions of the image capturing devices of the plurality of first data items, and associates the extracted plurality of first data items to create the second data. Calculator 131 thereby extracts the first data items obtained by other image capturing devices which are image capturing devices other than the specific image capturing device having taken the images determined to be subjected to the training data selection process by performance determiner 120 and can capture ranges overlapping a capturing range of the specific image capturing device. Accordingly, even in a case where acquirer 110 acquires the first data items from the plurality of image capturing devices having capturing ranges not overlapping one another, calculator 131 easily calculates the common region.

Figure 6:
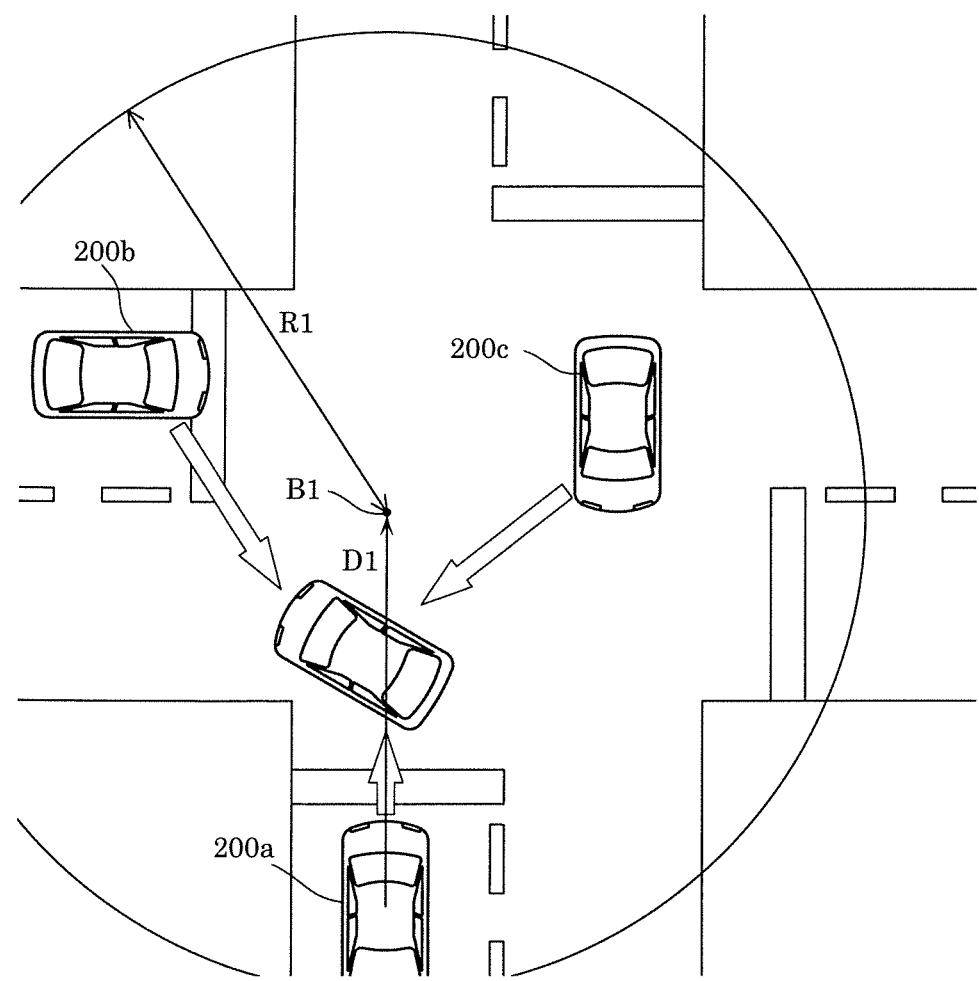
FIG. 6 is a diagram viewed from above and illustrating an example of a relation between a specific image capturing device and other image capturing devices each of which has a capturing range overlapping a capturing range of the specific image capturing device.

Note that in a case of selecting the plurality of image capturing devices having overlapping capturing ranges by analyzing the positions and the capturing directions of the image capturing devices of the plurality of first data items, calculator 131 selects image capturing devices located within a predetermined range from a reference location based on the position of the specific image capturing device. For example, as illustrated in FIG. 6, calculator 131 selects image capturing devices 200b and 200c located within a range having radius R1 centered about reference location B1 away from a distance D1 ahead of specific image capturing device 200a, as other image capturing devices 200b and 200c having capturing ranges overlapping a capturing range of specific image capturing device 200a. Note that FIG. 6 is a diagram viewed from above and illustrating an example of a relation between the specific image capturing device and the other image capturing devices each of which has the capturing range overlapping the capturing range of the specific image capturing device.

Here, a specific example of a method for calculating the common region will be described with reference to FIG. 7A to FIG. 7C.

Figure 7A:
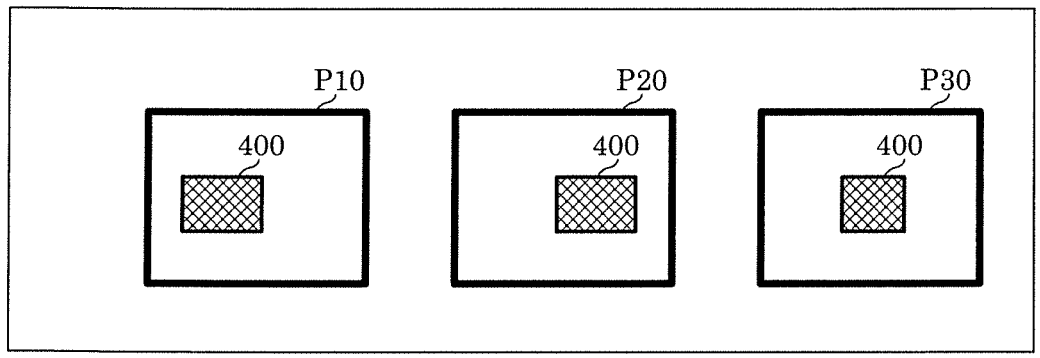
FIG. 7A illustrates a plurality of images taken by a plurality of image capturing devices at the same time point.
Figure 7B:
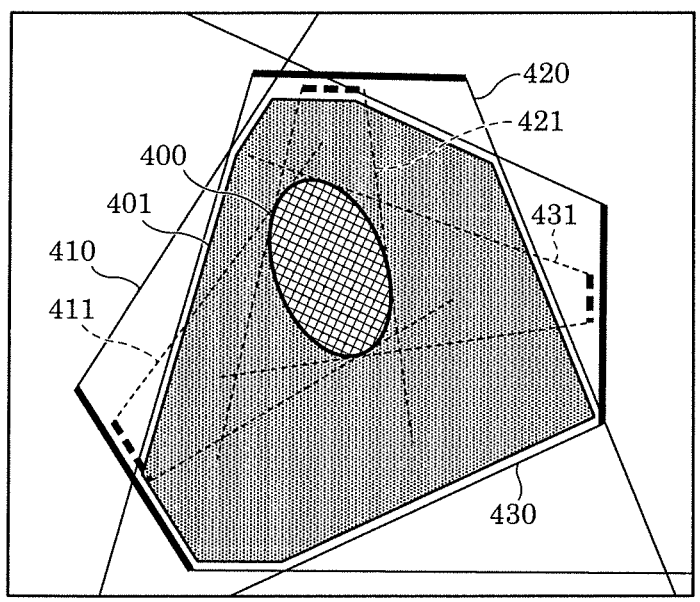
FIG. 7B is a diagram illustrating an example of an object position model obtained by use of a plurality of images, and positions and capturing directions of the plurality of image capturing devices at the same time points.
Figure 7C:
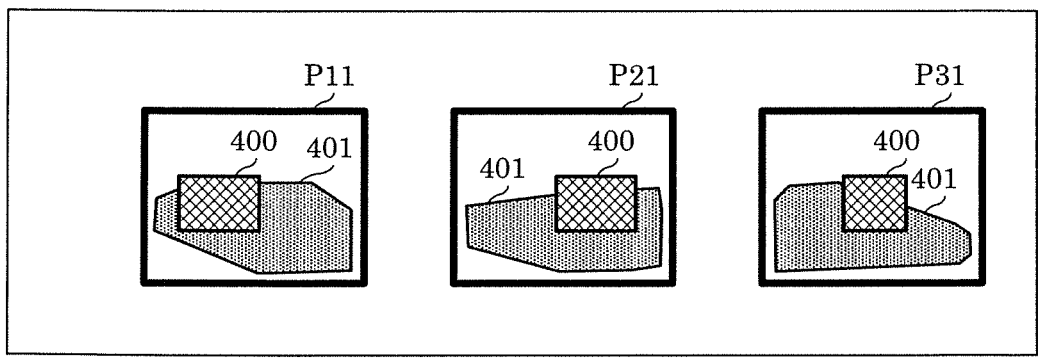
FIG. 7C illustrates a plurality of projected images obtained by projecting a calculated common region onto the plurality of images.

FIG. 7A to FIG. 7C are diagrams used for describing the specific example of the method for calculating the common region.

FIG. 7A illustrates a plurality of images P10, P20, and P30 taken by a plurality of image capturing devices 200a, 200b, and 200c at the same time point. The plurality of images P10, P20, and P30 are, for example, images including object 400 common to the images.

FIG. 7B is a diagram illustrating an example of an object position model obtained by use of a plurality of images P10, P20, and P30, and positions and capturing directions of the plurality of image capturing devices 200a, 200b, and 200c at the same time point described above. FIG. 7B illustrates the object position model viewed from above.

Specifically, calculator 131 uses image P10 and the position and the capturing direction of image capturing device 200a to calculate capturing range 410 and object range 411. Specifically, capturing range 410 indicates a capturing range that is estimated from the position and the capturing direction of image capturing device 200a that takes image P10. Object range 411 indicates a range where object 400 is present, obtained from a region of object 400 in image P10 and capturing range 410.

Similarly, calculator 131 calculates capturing range 420 and object range 421 from image P20, and the position and the capturing direction of image capturing device 200b. Capturing range 420 indicates a capturing range that is estimated from the position and the capturing direction of image capturing device 200b that takes image P20. Object range 421 indicates a range where object 400 is present, obtained from a region of object 400 in image P20 and capturing range 420.

Similarly, calculator 131 calculates capturing range 430 and object range 431 from image P30, and the position and the capturing direction of image capturing device 200c. Capturing range 430 indicates a capturing range that is estimated from the position and the capturing direction of image capturing device 200c that takes image P30. Object range 431 indicates a range where object 400 is present, obtained from a region of object 400 in image P30 and capturing range 430.

Note that calculator 131 determines that objects 400 is an object taken in the plurality of images P10, P20, and P30 in common to calculate object ranges 411, 421, and 431. Calculator 131 need not calculate object ranges 411, 421, and 431.

Next, calculator 131 uses calculated capturing ranges 410, 420, and 430 to calculate common region 401 common to capturing ranges 410, 420, and 430. Then, as illustrated in FIG. 7C, calculator 131 creates projected images P11, P21, and P31 obtained by projecting calculated common region 401 onto images P10, P20, and P30.

Degree-of-agreement determiner 132 determines a degree of agreement among a plurality of object detection results in the common region. Degree-of-agreement determiner 132 may determine the degree of agreement among a plurality of object detection results by, for example, comparing a plurality of object detection results with one another. Note that the object detection result in the common region is, for example, an object detected in a region on an image overlapping the common region.

Selection unit 133 selects an image to be used as the training data from among the plurality of images according to a degree of agreement determined by degree-of-agreement determiner 132. In a case where there is an object detection result that does not agree with others of the plurality of object detection results included in the second data, selection unit 133 selects an image to be used as the training data from among the plurality of images included in the second data.

For example, In a case where capturing performances of cameras 205 of the plurality of image capturing devices 200a, 200b, 200c, and the like are the same and processing performances of the object detection processes of the plurality of image capturing devices 200a, 200b, 200c, and the like are the same, selection unit 133 selects the image to be used as the training data from among the plurality of images according to a number or a ratio of agreeing object detection results of the plurality of object detection results included in the second data.

An example of selecting the image to be used as the training data will be described with reference to FIG. 8A and FIG. 8B.

Figure 8A:
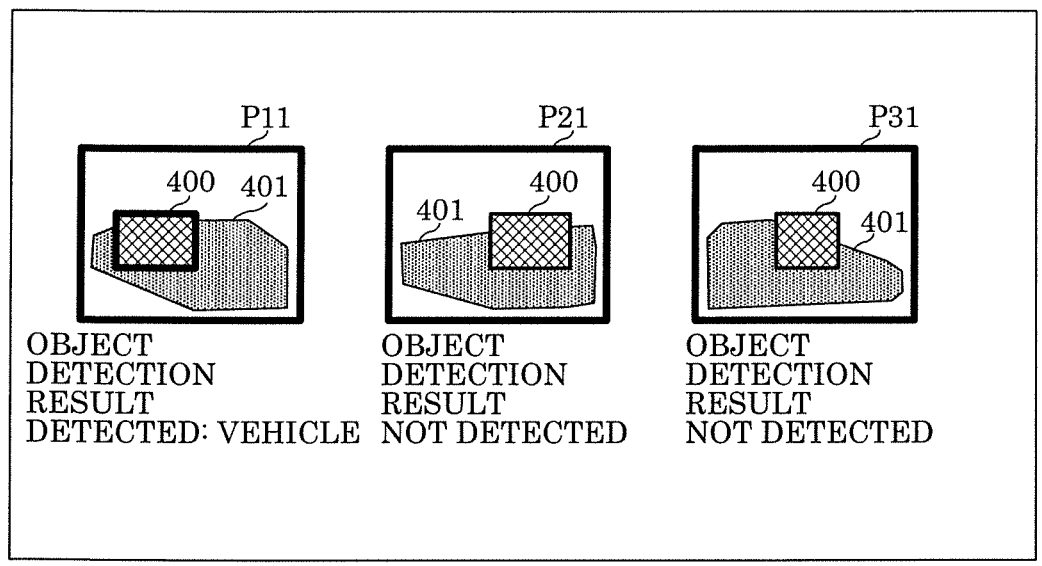
FIG. 8A is a diagram used for describing a first example of how to select an image to be used as training data.
Figure 8B:
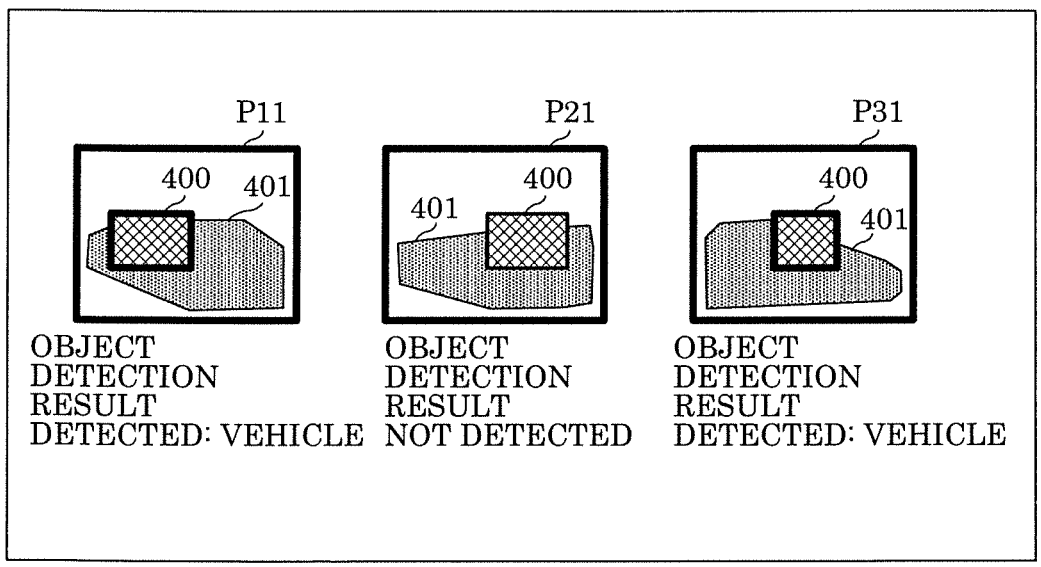
FIG. 8B is a diagram used for describing a second example of how to select an image to be used as training data.

FIG. 8A and FIG. 8B are diagrams used for describing an example of how to select an image to be used as training data.

As illustrated in FIG. 8A illustrating a first example, in a case where an object detection result in common region 401 on projected image P11 is a vehicle and each of object detection results in common region 401 on projected image P21 and P31 is nothing, degree-of-agreement determiner 132 may make a majority decision and determine that an object detection result in common region 401 is nothing as correct, and may determine that the object detection result on projected image P11 is highly likely to have false detection. Alternatively, as illustrated in FIG. 8B illustrating a second example, in a case where each of object detection results in common region 401 on projected images P11 and P31 is a vehicle and an object detection result in common region 401 on projected image P21 is nothing, degree-of-agreement determiner 132 may make a majority decision and determine that an object detection result in common region 401 is a vehicle as correct, and may determine that the object detection result on projected image P21 is highly likely to have false detection. According to a determination result in degree-of-agreement determiner 132, selection unit 133 then selects the image about which the object detection result is determined to be highly likely to have false detection, as an image to be used as the training data. In a case where there a plurality of object detection results on common region 401 have different results, selection unit 133 may select all of a plurality of images from which the plurality of object detection results are detected, as images to be used as the training data.

For example, in a case where the capturing performances of cameras 205 of the plurality of image capturing devices 200a, 200b, 200c, and the like are different from one another or the processing performances of the object detection processes of the plurality of image capturing devices 200a, 200b, 200c, and the like are different from one another, selection unit 133 determines a parameter for the selection process of selecting an image to be used as the training data from among the plurality of images according to how high the capturing performances of the plurality of image capturing devices 200a, 200b, 200c, and the like are or how high the processing performances of the object detection processes of the plurality of image capturing devices 200a, 200b, 200c, and the like are, and performs the selection process with the determined parameters. For example, selection unit 133 may assign a heavier weight to an object detection result from an image capturing device of higher performances according to how high the capturing performances of the plurality of image capturing devices 200a, 200b, 200c, and the like are or how high the processing performances of the object detection processes are, and considering that an object detection result to which a heavier weight is assigned has a higher precision, selection unit 133 may select an image corresponding to an object detection result different from an object detection result of high precision as an image to be used as the training data. That is, selection unit 133 selects an image corresponding to an object detection result different from object detection results with evaluation values equal to or higher than a predetermined threshold value obtained by multiplying the object detection results by coefficients that are increased with how high the performances are, as an image to be used as the training data.

[1-2. Operations]

Next, operations of information processing system 1 according to an embodiment will be described.

FIG. 9 is a sequence diagram illustrating an example of operations performed in an information processing system according to an embodiment.

First, in each of image capturing devices 200*a*, 200*b*, 200*c*, and the like, detector 210 detects an image, and a position and a capturing direction of an image capturing device at a time point at which the image is taken (S11), and stores the time point of the capturing, the detected images, and the detected position and capturing direction of the image capturing device in memory 220.

Next, object detector 230 of the image capturing device performs the object detection process on the image detected by detector 210 to detect an object, obtaining an object detection result (S12). The obtained object detection result is associated with the image subjected to the object detection process and stored in memory 220. The image capturing device thereby creates first data in which the time point of the capturing, the detected image, the detected position and capturing direction of the image capturing device, and the object detection result are associated with one another.

Transmitter 240 of the image capturing device then transmits the created first data to information processing apparatus 100 (S13).

In information processing apparatus 100, acquirer 110 acquires the first data transmitted from each of image capturing devices 200*a*, 200*b*, 200*c*, and the like (S21).

Next, performance determiner 120 of information processing apparatus 100 determines whether to perform a training data selection process using performance unit 130, according to a specific object detection result that is performed by use of images created through capturing by a specific image capturing device of the plurality of image capturing devices 200*a*, 200*b*, 200*c*, and the like (S22).

In a case where performance determiner 120 determines that the training data selection process is to be performed (Yes in S22), performance unit 130 of information processing apparatus 100 performs the training data selection process (S23). The training data selection process will be described later.

Meanwhile, in a case where performance determiner 120 determines that the training data selection process is not to be performed (No in S22), performance unit 130 of information processing apparatus 100 does not perform the training data selection process.

Note that whether or not the training data selection process is performed, processes of steps S11 to S13 in each of image capturing devices 200*a*, 200*b*, 200*c*, and the like, and processes of steps S21 to S23 in information processing apparatus 100 are repeated in information processing system 1.

Note that details of the processes of steps S11 to S13 and S21 to S23 by the processing units have already described in the description of the functional configuration of image capturing devices 200*a*, 200*b*, 200*c*, and the like and the description of the functional configuration of information processing apparatus 100 with reference to FIG. 4 to FIG. 8B, and thus the details will not be described.

Figure 10:
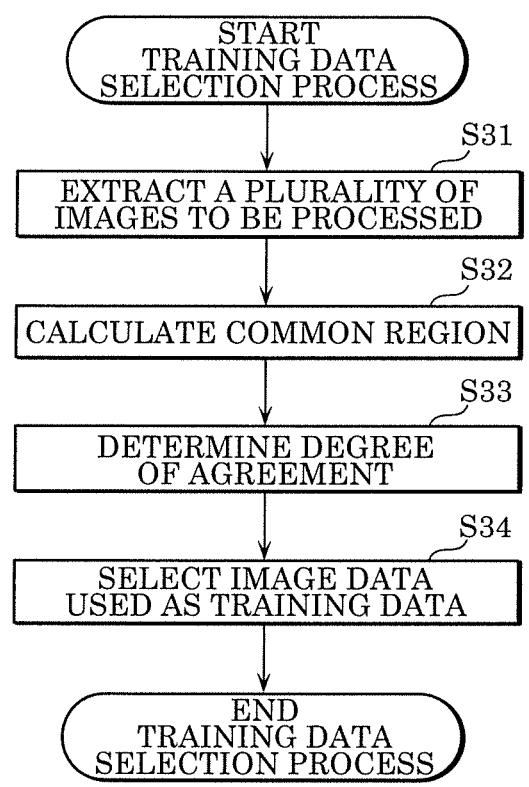
FIG. 10 is a flowchart illustrating an example of details of training data selection process in the information processing apparatus according to an embodiment.

FIG. 10 is a flowchart illustrating an example of details of a training data selection process in the information processing apparatus according to an embodiment.

When the training data selection process in step S23 is started, calculator 131 of performance unit 130 extracts a plurality of first data items that are associated with an image created through capturing by a specific image capturing device having the same time, and that include a common capturing range, from among a plurality of first data items acquired by acquirer 110. Calculator 131 thereby extracts the plurality of taken images (S31).

Next, calculator 131 uses the plurality of extracted first data items to calculate a common region that is seen in the plurality of images in common, based on positions and capturing directions of the plurality of image capturing devices 200*a*, 200*b*, 200*c*, and the like (S32).

Degree-of-agreement determiner 132 then determines a degree of agreement among a plurality of object detection results in the common region (S33).

Selection unit 133 thereafter selects an image to be used as the training data from among the plurality of images according to a degree of agreement determined by degree-of-agreement determiner 132 (S34), and ends the training data selection process.

Note that details of the processes of steps S31 to S34 by the processing units have already described in the description of the functional configuration of image capturing devices 200*a*, 200*b*, 200*c*, and the like and the description of the functional configuration of information processing apparatus 100 with reference to FIG. 4 to FIG. 8B, and thus the details will not be described.

[1-3. Effects]

By the information processing method according to the present embodiment, in the training data selection process, a common region that is seen in each of a plurality of images in common is calculated based on a plurality of positions and capturing directions of a plurality of image capturing devices, a degree of agreement among a plurality of object detection results in the common region is determined, and according to the determined degree of agreement, an image to be used as the training data is selected from among the plurality of images.

For this reason, in a case where the plurality of image capturing devices capture an object common to the plurality of image capturing devices, the plurality of object detection results from the plurality of object detection processes for the common object can be obtained. This enables selection of images to be used as training data according to the degree of agreement among the plurality of object detection results about the common object. For example, images subjected to the object detection processes that produce object detection results not agreeing with one another can be selected as the images to be used as the training data. Therefore, the information processing method is less susceptible to a precision of an object detection process using sensors and is capable of providing captured images to be used as training data in a stable manner.

Furthermore, the information processing method according to this embodiment further includes: determining whether to perform the training data selection process, according to a specific object detection result obtained through an object detection process performed using an image created through capturing by a specific image capturing device of the image capturing devices; and performing the training data selection process in a case where the training data selection process is determined to be performed. For this reason, the training data selection process can be performed in a situation that needs the learning, such as a situation where the precisions of the object detection results are low, which makes it possible to obtain intended training data more reliably. In addition, by not performing the training data selection process in a situation that does not need the learning, unnecessary performance of the process can be reduced.

Furthermore, according to the information processing method according to this embodiment, an other image capturing device which is one of the image capturing devices other than the specific image capturing device is an image capturing device capable of capturing ranges overlapping a capturing range of the specific image capturing device. For this reason, the other image capturing devices can be selected with reference to the specific image capturing device. Therefore, the object detection results useful for determining the degree of agreement can be obtained.

Furthermore, according to the information processing method according to this embodiment, the other image capturing device is an image capturing device that is located within a predetermined range from a reference location with reference to a position of the specific image capturing device. For this reason, other image capturing devices highly likely to capture the same object that the specific image capturing device captures can be selected.

Furthermore, according to the information processing method according to this embodiment, the specific object detection result includes a likelihood of an object detection result, and the determining whether to perform the training data selection process includes determining that the training data selection process is to be performed when the likelihood satisfies a predetermined condition. For this reason, the training data selection process can be performed in a situation that needs the learning, such as a situation where the likelihood is low, which makes it possible to obtain intended training data more reliably. In addition, by not performing the training data selection process in a situation that does not need the learning, unnecessary performance of the process can be reduced.

Furthermore, according to the information processing method according to this embodiment, the determining whether to perform the training data selection process includes: acquiring statistical information on at least one item of information from among capturing times of the images, positions of the image capturing devices that perform the capturing to create the images, and an attribute or a state of an object detected through the object detection processes; and determining whether to perform the training data selection process using the acquired statistical information. For this reason, the training data selection process can be performed in a situation that needs the learning, such as a situation where capturing conditions or capturing details are suitable for the learning from a statistical viewpoint, which makes it possible to obtain intended training data more reliably. In addition, by not performing the training data selection process in a situation that does not need the learning, unnecessary performance of the process can be reduced.

Furthermore, according to the information processing method according to this embodiment, the statistical information includes rarity information that indicates a rarity of the at least one item of information, and the determining whether to perform the training data selection process includes: determining that the training data selection process is to be performed when the rarity satisfies a predetermined condition. For this reason, the training data selection process can be performed in a case where the rarity satisfies the predetermined condition, which makes it possible to obtain intended training data more reliably. In addition, by not performing the training data selection process in a case where the rarity fails to satisfy the predetermined condition, unnecessary performance of the process can be reduced.

Furthermore, according to the information processing method according to this embodiment, in the training data selection process, in a case where there is an object detection result that does not agree with others of the object detection results, an image to be used as training data is selected from among the images. This enables selection of images as training data. For example, images subjected to the object detection processes that produce object detection results having a possibility of false detection or omission of detection can be selected as the training data. As a result, the image taken in a situation different from a situation of an image that is already selected as the training data can be selected as the training data.

Furthermore, according to the information processing method according to this embodiment, in a case where performances of the image capturing devices are same and performances of the object detection processes are same, the image to be used as the training data is selected from among the images according to a number or a ratio of agreeing object detection results of the object detection results. For this reason, for example, images with which the number of agreeing object detection results is less than a predetermined number or a ratio of agreement among the object detection results is lower than a predetermined ratio can be selected as the training data.

In addition, according the information processing method according to the present embodiment, in one of a case where performances of the image capturing devices are different from one another and a case where performances of the object detection processes are different from one another, a parameter for the training data selection process is determined according to how high the performances of the image capturing devices are or how high the performances of the object detection processes are, and the training data selection process with the determined parameter is performed. For this reason, even in a case where the plurality of image capturing devices have specifications different from one another or the plurality of object detection processes have specifications different from one another, the respective specifications are taken into account, and thus images including an image subjected to the object detection process that produces an object detection result having a possibility of false detection or omission of detection can be selected as the training data. As a result, the image taken in a situation different from a situation of an image that is already selected as the training data can be selected as the training data.

[1-4. Variations]

[1-4-1. Variation 1]

Figure 11:
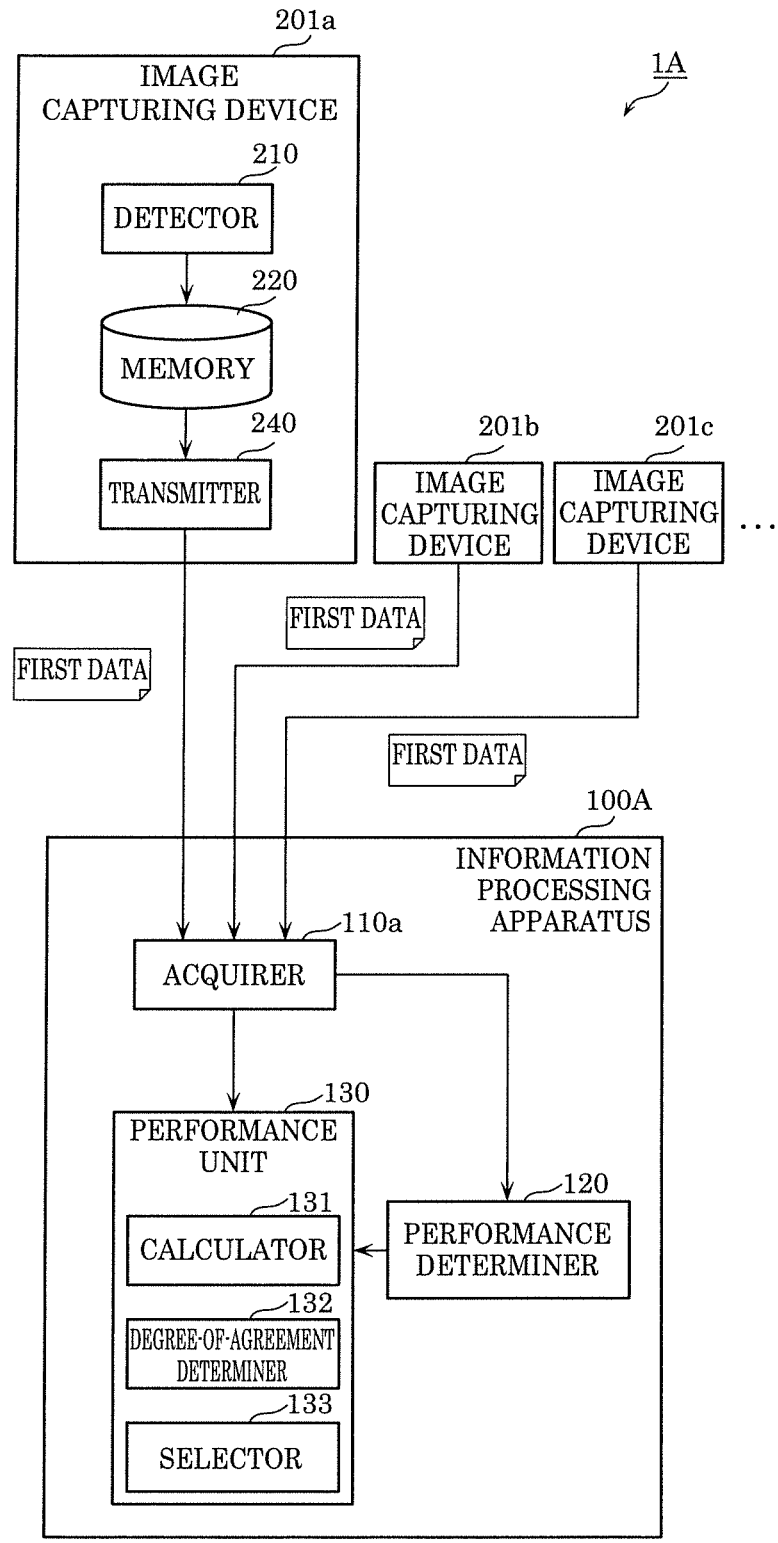
FIG. 11 is a block diagram illustrating an example of a functional configuration of the information processing system according to Variation 1.

Information processing system 1 according to the embodiment described above has a configuration in which each of image capturing devices 200*a*, 200*b*, 200*c*, and the like, has object detector 230 performing an object detection process on an image detected by detector 210, but the configuration is not limited to this, and, for example, image capturing devices 201*a*, 201*b*, 201*c*, and the like each having a configuration not including object detector 230 may be adopted, as illustrated in FIG. 11. In information processing system 1A in this case, acquirer 110*a* of information processing apparatus 100A performs an object detection process on an image included in each of a plurality of acquired first data items. FIG. 11 is a block diagram illustrating an example of a functional configuration of the information processing system according to Variation 1.

Figure 12:
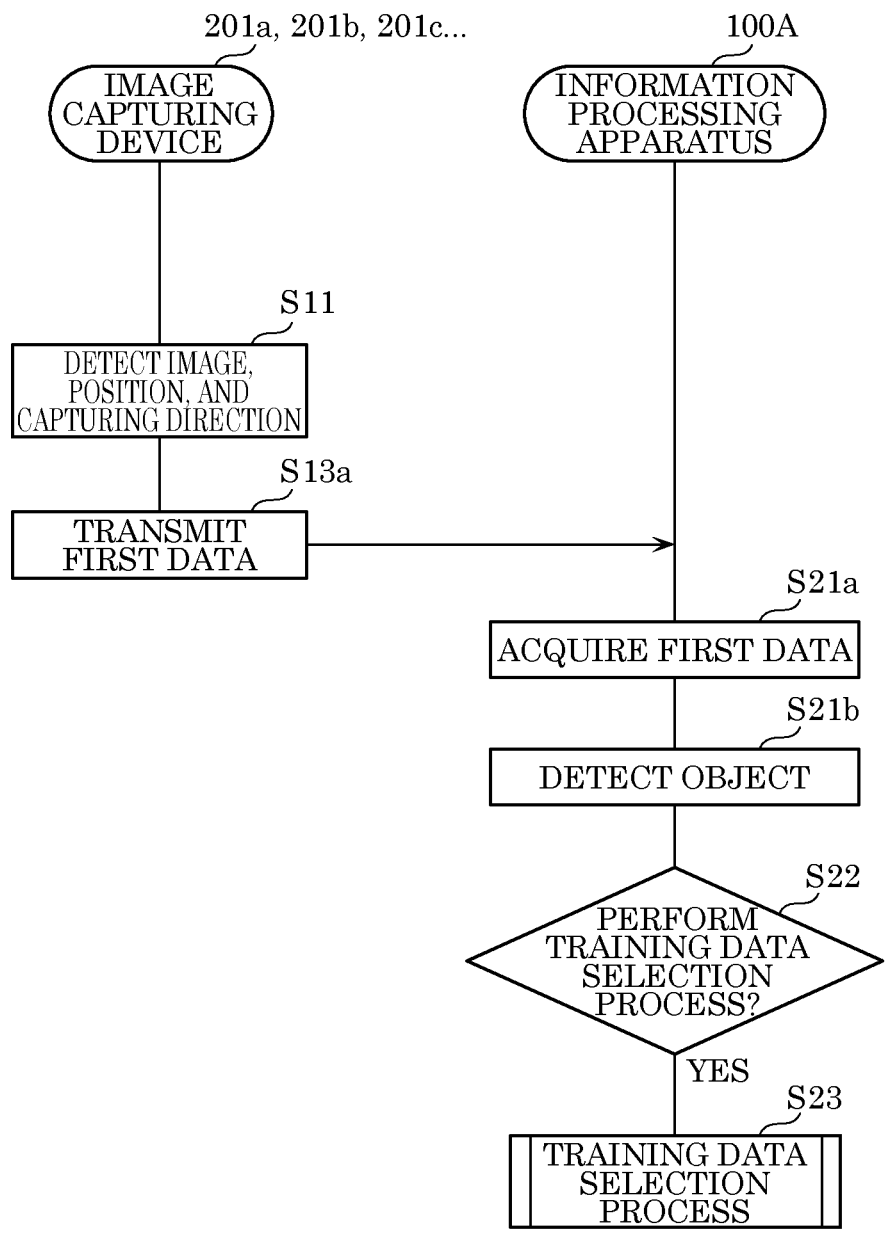
FIG. 12 is a sequence diagram illustrating an example of operations performed in an information processing system according to Variation 1.

FIG. 12 is a sequence diagram illustrating an example of operations performed in an information processing system according to Variation 1.

First, in each of image capturing devices 201*a*, 201*b*, 201*c*, and the like, detector 210 detects an image, and a position and a capturing direction of an image capturing device at a time point at which the image is taken (S11), and stores the detected images, and the detected position and capturing direction of the image capturing device in memory 220.

Next, transmitter 240 of image capturing device 200*a* transmits first data including the time point of the capturing, the detected image, and the detected position and capturing direction of the image capturing device to information processing apparatus 100A (S13*a*).

In information processing apparatus 100A, acquirer 110*a* acquires the first data transmitted from each of image capturing devices 201*a*, 201*b*, 201*c*, and the like (S21*a*).

Next, acquirer 110*a* of information processing apparatus 100A performs an object detection process on an image included in each of the plurality of acquired first data items to detect an object, obtaining an object detection result (S21*b*).

Processes of the following steps S22 and S23 are the same as those in the embodiment, and description of the processes will be omitted.

[1-4-2. Variation 2]

In information processing system 1 according to the embodiment described above, in the plurality of image capturing devices 200*a*, 200*b*, 200*c*, and the like, it is assumed that the capturing is performed all the time in a predetermined period by cameras 205 while the vehicles being the plurality of image capturing devices 200*a*, 200*b*, 200*c*, and the like are operating (e.g., engines of the vehicles are driving or powered on), but information processing system 1 is not limited to this. For example, the specific image capturing device may be caused to perform the same determination that performance determiner 120 performs and caused to transmit a capturing request to other image capturing devices located around the specific image capturing device at a time point at which an image on which the training data selection process is to be performed is acquired, by which the other image capturing devices may be caused to perform the capturing. The capturing request from the specific image capturing device may be transmitted to the other image capturing devices via information processing apparatus 100 or may be transmitted directly to the other image capturing devices.

This configuration allows the other image capturing devices to perform capturing only when receiving the capturing request, which can reduce a frequency of a capturing process.

[1-4-3. Variation 3]

In information processing system 1 according to the embodiment described above, it is assumed that all of the first data items obtained in the plurality of image capturing devices 200*a*, 200*b*, 200*c*, and the like are transmitted to information processing apparatus 100, but information processing system 1 is not limited to this. For example, the specific image capturing device may be caused to perform the same determination that performance determiner 120 performs and caused to transmit a capturing request to other image capturing devices located around the specific image capturing device at a time point at which an image on which the training data selection process is to be performed is acquired, by which the other image capturing devices can transmit only first data items at the time point to information processing apparatus 100. This configuration can reduce a communication load from the image capturing devices to information processing apparatus 100, which allows information processing apparatus 100 to prevent a storage capacity of a storage for storing the first data items from becoming scarce.

In each of the above-described embodiments, the constituent components may be implemented in a form of dedicated hardware or by executing software programs adapted to the constituent components. The constituent components may be implemented by a program executing unit such as a CPU or a processor reading and executing a software program recorded in a recording medium such as a hard disk or a semiconductor memory. Here, software implementing the information processing method, the information processing apparatus, and the like in each of the above-described embodiments is the following program.

Specifically, the program causes a computer to execute an information processing method that includes: acquiring a plurality of images created through capturing at the same time, and positions and capturing directions of a plurality of image capturing devices that created respectively each of the images; acquiring a plurality of object detection results, wherein the object detection results are obtained respectively through a plurality of object detection processes performed using each of the images; and performing a training data selection process using the images, the positions and the capturing directions, and the object detection results acquired, wherein the training data selection process includes: calculating a common region that is seen in the images in common, based on the positions and the capturing directions; determining a degree of agreement among the object detection results in the common region; and selecting an image to be used as training data from among the images, according to the degree of agreement.

Although an information processing method and an information processing system according to one or more aspects of the present disclosure has been described based on exemplary embodiments above, the present disclosure is not limited to the exemplary embodiments described above. Other forms realized through various modifications to the embodiments conceived by a person of ordinary skill in the art or through a combination of the components in different embodiments described above, so long as they do not depart from the essence of the present disclosure, may be included in the scope in the one or more aspects of the present disclosure.

In addition, in the embodiment described above, an example is given in which the training data is a captured image, but the training data is not limited to this. For example, the training data may be data such as point cloud data obtained from an optical sensor different from an image sensor, such as a LIDAR.

Note that machine learning may be used in the processes performed by performance determiner 120 and degree-of-agreement determiner 132. Examples of the machine learning include supervised learning that learns a relation between an input and an output using training data, in which labels (output information) is given to input information, unsupervised learning that builds a structure of data only from an input without labels, semi-supervised learning that uses both of an input with labels and an input without labels, and reinforcement learning that gains feedback (reward) on an action selected according to a result of observing a state and learns consecutive actions that can provide a maximum reward. As specific methods of the machine learning, there are neural network (including deep learning using a multi-layered neural network), genetic programming, decision tree, Bayesian network, support vector machine (SVM), and the like. In the present disclosure, any one of the specific examples described above may be used.

Although the present disclosure has been described and illustrated in detail, it is clearly understood that the same is by way of example only and is not to be taken by way of limitation, the scope of the present disclosure being limited only by the terms of the appended claims.

INDUSTRIAL APPLICABILITY

The present disclosure is useful as an information processing method, an information processing system, and the like that are capable of providing a captured image to be used as training data from a large number of obtained images in a stable manner while being less susceptible to a precision of an object detection process using a sensor.

What is claimed is:

1. An information processing method, comprising the following performed using a computer:
    acquiring a plurality of images created through capturing at the same time, and positions and capturing directions of a plurality of image capturing devices that created respectively each of the images;
    acquiring a plurality of object detection results, wherein the object detection results are obtained respectively through a plurality of object detection processes performed using each of the images; and
    performing a training data selection process using the images, the positions and the capturing directions, and the object detection results acquired, wherein
    the training data selection process includes:
    calculating a common region that is seen in the images in common, based on the positions and the capturing directions;
    determining a degree of agreement among the object detection results in the common region; and
    selecting an image to be used as training data from among the images, according to the degree of agreement, wherein
    in a case where image capture performances of the image capturing devices are different from one another, the training data selection process includes assigning a weight to each object detection result according to an image capture performance of a corresponding image capturing device.

2. An information processing method, comprising the following performed using a computer:
    acquiring a plurality of images created through capturing at the same time, and positions and capturing directions of a plurality of image capturing devices that created respectively each of the images;
    acquiring a plurality of object detection results, wherein the object detection results are obtained respectively through a plurality of object detection processes performed using each of the images;
    determining whether to perform a training data selection process, according to a specific object detection result obtained through an object detection process performed using an image created through capturing by a specific image capturing device of the image capturing devices; and
    performing the training data selection process in a case where the training data selection process is determined to be performed, the training data selection process being performed using the images, the positions and the capturing directions, and the object detection results acquired, wherein
    the training data selection process includes:
    calculating a common region that is seen in the images in common, based on the positions and the capturing directions;
    determining a degree of agreement among the object detection results in the common region; and
    selecting an image to be used as training data from among the images, according to the degree of agreement, wherein
    in a case where image capture performances of the image capturing devices are different from one another, the training data selection process includes assigning a weight to each object detection result according to an image capture performance of a corresponding image capturing device.

3. The information processing method according to claim 1, wherein
    another image capturing device which is one of the image capturing devices other than a specific image capturing device is an image capturing device capable of capturing ranges overlapping a capturing range of the specific image capturing device.

4. The information processing method according to claim 3, wherein
    the other image capturing device is an image capturing device that is located within a predetermined range from a reference location with reference to a position of the specific image capturing device.

5. The information processing method according to claim 1, further comprising:
    causing another image capturing device which is one of the image capturing devices other than a specific image capturing device to perform the capturing.

6. The information processing method according to claim 2, wherein
    the specific object detection result includes a likelihood of an object detection result, and
    the determining whether to perform the training data selection process includes:
    determining that the training data selection process is to be performed when the likelihood satisfies a predetermined condition.

7. The information processing method according to claim 2, wherein
    the determining whether to perform the training data selection process includes:
    acquiring statistical information on at least one item of information from among capturing times of the images, positions of the image capturing devices that perform the capturing to create the images, and an attribute or a state of an object detected through the object detection processes; and
    determining whether to perform the training data selection process using the acquired statistical information.

8. The information processing method according to claim 7, wherein the statistical information includes rarity information that indicates a rarity of the at least one item of information, and the determining whether to perform the training data selection process includes:

determining that the training data selection process is to be performed when the rarity satisfies a predetermined condition.

9. The information processing method according to claim 1, wherein in the training data selection process, in a case where there is an object detection result that does not agree with others of the object detection results, an image to be used as training data is selected from among the images.

10. The information processing method according to claim 9, wherein in a case where performances of the image capturing devices are same and performances of the object detection processes are same, the image to be used as the training data is selected from among the images according to a number or a ratio of agreeing object detection results of the object detection results.

11. An information processing system which is configured to:

acquire a plurality of images created through capturing at the same time, positions and capturing directions of a plurality of image capturing devices that created respectively each of the images, and a plurality of object detection results, wherein the object detection results are obtained respectively through a plurality of object detection processes performed using each of the images; and perform a training data selection process using the images, the positions and the capturing directions, and the object detection results acquired by the acquirer, wherein as the training data selection process, the information processing system is configured to:

calculate a common region that is seen in the images in common, based on the positions and the capturing directions;

determine a degree of agreement among the object detection results in the common region; and select an image to be used as training data from among the images, according to the degree of agreement, wherein in a case where image capture performances of the image capturing devices are different from one another, the training data selection process includes assigning a weight to each object detection result according to an image capture performance of a corresponding image capturing device.

* * * * *